United States Patent
Kennedy

(10) Patent No.: US 10,877,535 B2
(45) Date of Patent: Dec. 29, 2020

(54) APPARATUS AND METHOD FOR UNIFIED SYSTEM POWER BUTTON BEHAVIOR ACROSS DIFFERENT INFORMATION HANDLING SYSTEM ARCHITECTURES

(71) Applicant: DELL PRODUCTS, LP, Round Rock, TX (US)

(72) Inventor: Jeffrey Kennedy, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 279 days.

(21) Appl. No.: 16/054,878

(22) Filed: Aug. 3, 2018

(65) Prior Publication Data

US 2020/0042059 A1 Feb. 6, 2020

(51) Int. Cl.
*G06F 1/26* (2006.01)
*G06F 1/24* (2006.01)

(52) U.S. Cl.
CPC . *G06F 1/26* (2013.01); *G06F 1/24* (2013.01)

(58) Field of Classification Search
None
See application file for complete search history.

(56) References Cited

U.S. PATENT DOCUMENTS

| | | | | |
|---|---|---|---|---|
| 5,838,982 | A * | 11/1998 | Cooper | G06F 1/3203 713/300 |
| 10,698,696 | B2 * | 6/2020 | Raghuram | G06F 1/24 |
| 2002/0099925 | A1 * | 7/2002 | Chang | G06F 13/4068 712/203 |
| 2004/0019815 | A1 * | 1/2004 | Vyssotski | G06F 1/3203 713/322 |
| 2005/0071696 | A1 * | 3/2005 | Pearl | G06F 1/26 713/300 |
| 2006/0149954 | A1 * | 7/2006 | Hageman | G06F 9/4403 713/1 |
| 2007/0162776 | A1 * | 7/2007 | Carpenter | G06F 1/3203 713/320 |
| 2008/0151452 | A1 * | 6/2008 | Ren | G06F 1/26 361/86 |
| 2009/0019295 | A1 * | 1/2009 | Wu | G06F 1/26 713/300 |
| 2009/0278621 | A1 * | 11/2009 | Kris | H03K 5/1515 332/109 |
| 2009/0319809 | A1 * | 12/2009 | Shi | G06F 1/26 713/300 |
| 2014/0373183 | A1 | 12/2014 | Li et al. | |
| 2015/0006922 | A1 | 1/2015 | Huang et al. | |

* cited by examiner

*Primary Examiner* — Danny Chan
(74) *Attorney, Agent, or Firm* — Larson Newman, LLP

(57) ABSTRACT

An information handling system includes a chipset component configured to implement one of two hardware architectures, and a power button circuit coupled to the chipset component. The power button circuit receives an input signal from an assertion of a power button. The power button circuit further determines that the chipset implements the first hardware architecture and provides a first output signal to the chipset component in response. The first output signal is based on the input signal. The power button circuit further determines that the chipset component implements the second hardware architecture, and provides a second output signal to the chipset component in response. The second output signal is based on the input signal for a first predetermined time, followed by a pulse to the chipset component for a second predetermined time.

18 Claims, 4 Drawing Sheets

APPARATUS AND METHOD FOR UNIFIED SYSTEM POWER BUTTON BEHAVIOR ACROSS DIFFERENT INFORMATION HANDLING SYSTEM ARCHITECTURES

FIELD OF THE DISCLOSURE

This disclosure generally relates to information handling systems, and more particularly relates to unified system power button behavior across different information handling system architectures.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may be based on one of two hardware architectures. The information handling system may include a chipset component configured to implement one of two hardware architectures, and a power button circuit coupled to the chipset component. The power button circuit may receive an input signal from an assertion of a power button. The power button circuit may further determine that the chipset implements the first hardware architecture and provide a first output signal to the chipset component in response. The first output signal may be based on the input signal. The power button circuit may further determine that the chipset component implements the second hardware architecture, and provide a second output signal to the chipset component in response. The second output signal may be based on the input signal for a first predetermined time, followed by a pulse to the chipset component for a second predetermined time

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
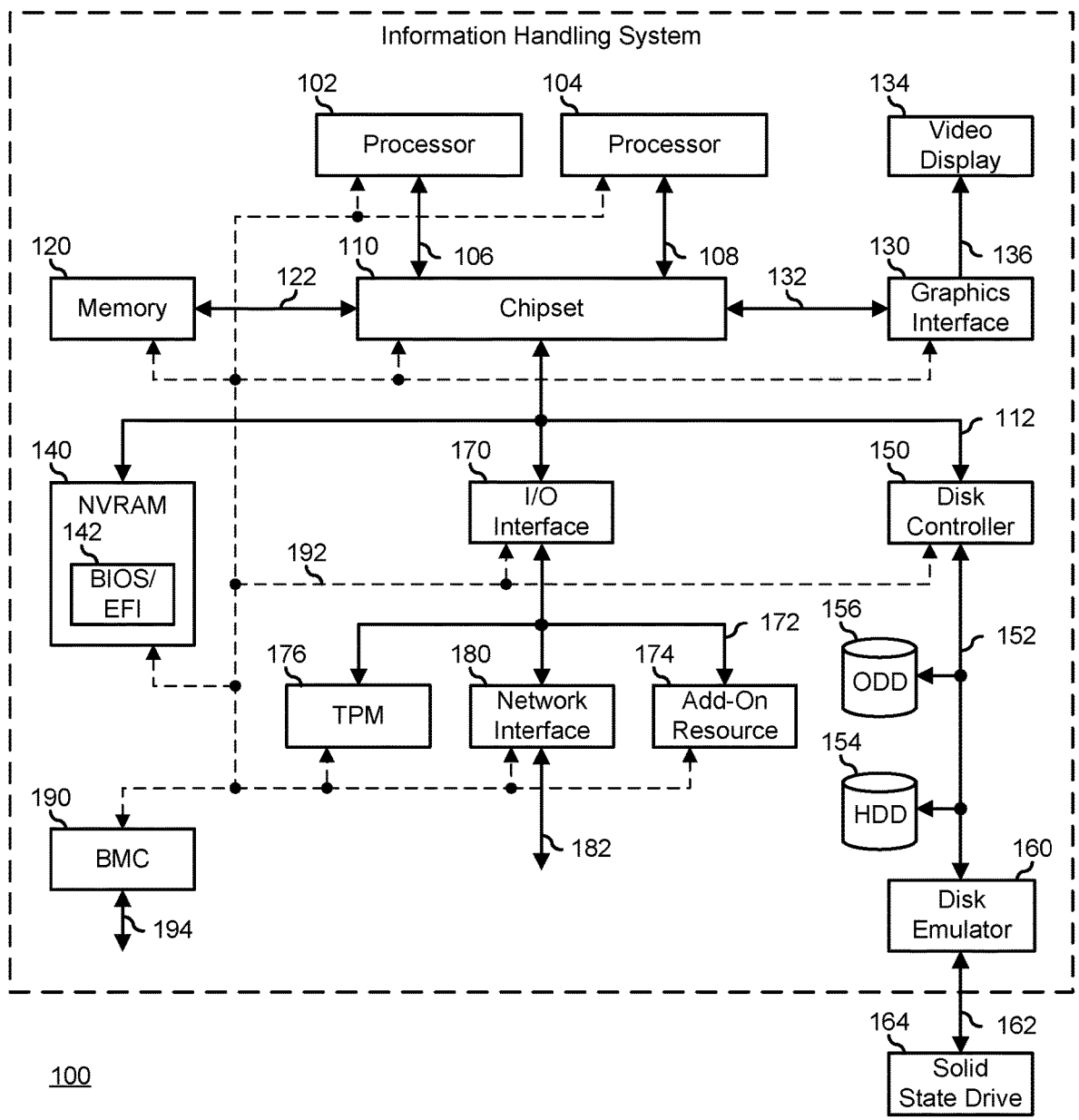
FIG. 1 is a block diagram of an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid state drive (SSD) 164, an input/output (I/O) interface 170 connected to an add-on resource 174 and a trusted platform module (TPM 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like.

Chipset 110 represents an integrated circuit or group of integrated circuits that manages the data flows between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a Peripheral Component Interconnect-Express (PCIe) interface and graphics adapter 130 can include a four lane (×4) PCIe adapter, an eight lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface 180 translates information from a format suitable to the peripheral channel to a format suitable to external devices. In a particular embodiment, network interface 180 includes a network interface card (NIC) or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a WiFi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term baseboard management controller (BMC) is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 180 can vary considerably based on the type of information handling system. BMC 190 can operate in accordance with an Intelligent Platform Management Interface (IPMI). Examples of BMC 190 include an Integrated Dell Remote Access Controller (iDRAC). Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image. BMC 190 utilizes various protocols and application programming interfaces (APIs) to direct and control the processes for monitoring and maintaining the system firmware. An example of a protocol or API for monitoring and maintaining the system firmware includes a graphical user interface (GUI) GUI associated with BMC 190, an interface defined by the Distributed Management Taskforce (DMTF) (e.g., a Web Services Management (WS-MAN) interface, a Management Component Transport Protocol (MCTP) or, a Redfish interface), various vendor defined interfaces (e.g., a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (e.g., a baseboard, a motherboard, or any combination thereof) of information handling system 100, or is integrated onto another element of the information handling system such as chipset 110, or another suitable element, as needed or desired. As such, BMC 190 can be part of an integrated circuit or a chip set within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 is characterized by the fact that major components of the information handling system (e.g., processors 102 and 104 and chipset 110) are typically manufactured by a common manufacturer. Different manufacturers may provide commonalities in their respective architectures such that code written for one manufacturer's components will operate on another manufacturer's components. In such cases, the various manufacturers' components may be said to implement a common architecture. An example of an architecture may include an x86 architecture, a 64-bit Intel Architecture (IA-64), an ARM architecture, or the like. However, even within a particular common architecture, different manufacturers may provide differences in the way that the components are utilized or designed to interact with each other and the other components of an information handling system. Thus the circuitry, layout, and design of a particular information handling system may include glue logic that permits the components associated with a first manufacturer to work seamlessly together, but such glue logic may be different from the glue logic needed to implement an information handling system that utilizes components associated with a different manufacturer.

Some differences in the glue logic between different manufacturers' components are not generally detectable by a user of the different information handling systems. For example, differences in the terminal impedance for signal traces between different manufacturers would not result in different user experiences with information handling systems that utilize different manufacturers' component. On the other hand, other differences in the glue logic between different manufactures, or differences in the behavior of one manufacture's components, vis a vis another manufacturers' components may result in different user experiences in utilizing the different information handling systems.

An example of a user-detectable difference in behavior includes the way in which components manufactured by the Intel Corporation (hereinafter "Intel") respond to the use of a power button, and the way in which components manufactured by Advanced Micro Devices, Incorporated (hereinafter "AMD") respond to the use of a power button. In particular, in an information handling system including components manufactured by Intel, the pressing of the power button (hereinafter referred to as "asserting" the power button) results in a logic "0" signal being detected by the chipset, and the chipset initiates a shutdown of the information handling system via an orderly process of closing applications and terminating the operating system before shutting off the DC power supply (hereinafter referred to as a "graceful shutdown"). In contrast, in an information handling system including components manufactured by AMD, the assertion of the power button similarly results in a logic "0" signal being provided to the chipset, but the chipset does not immediately initiate a graceful shutdown of the information handling system until the power button is de-asserted, thereby providing a logic "1" signal to the chipset.

While this may seem to be a trivial difference, the situation is complicated by whether or not the operating system (OS) instantiated on the information handling system supports the Advanced Configuration and Power Interface (ACPI) standard. In information handling systems with OS' that implement the ACPI standard, the assertion of the power button for a duration that is longer than a Power Button Override (PBO) results in the information handling system being forced into an immediate shutdown by shutting off the DC power supply (hereinafter referred to as a "hard shutdown"). The PBO is typically set at −4 seconds for AMD-based information handling systems, and at −5 seconds for Intel-based information handling systems. Thus, in an information handling system including components manufactured by Intel, the long assertion of the power button immediately results in the chipset attempting to perform a graceful shutdown before the expiration of the BPO, after which time the information handling system experiences a hard shutdown. In contrast, in an information handling system including components manufactured by AMD, the long assertion of the power button only results in the information handling system experiencing a hard shutdown, and no attempt will be made to perform a graceful shutdown.

Figure 2:
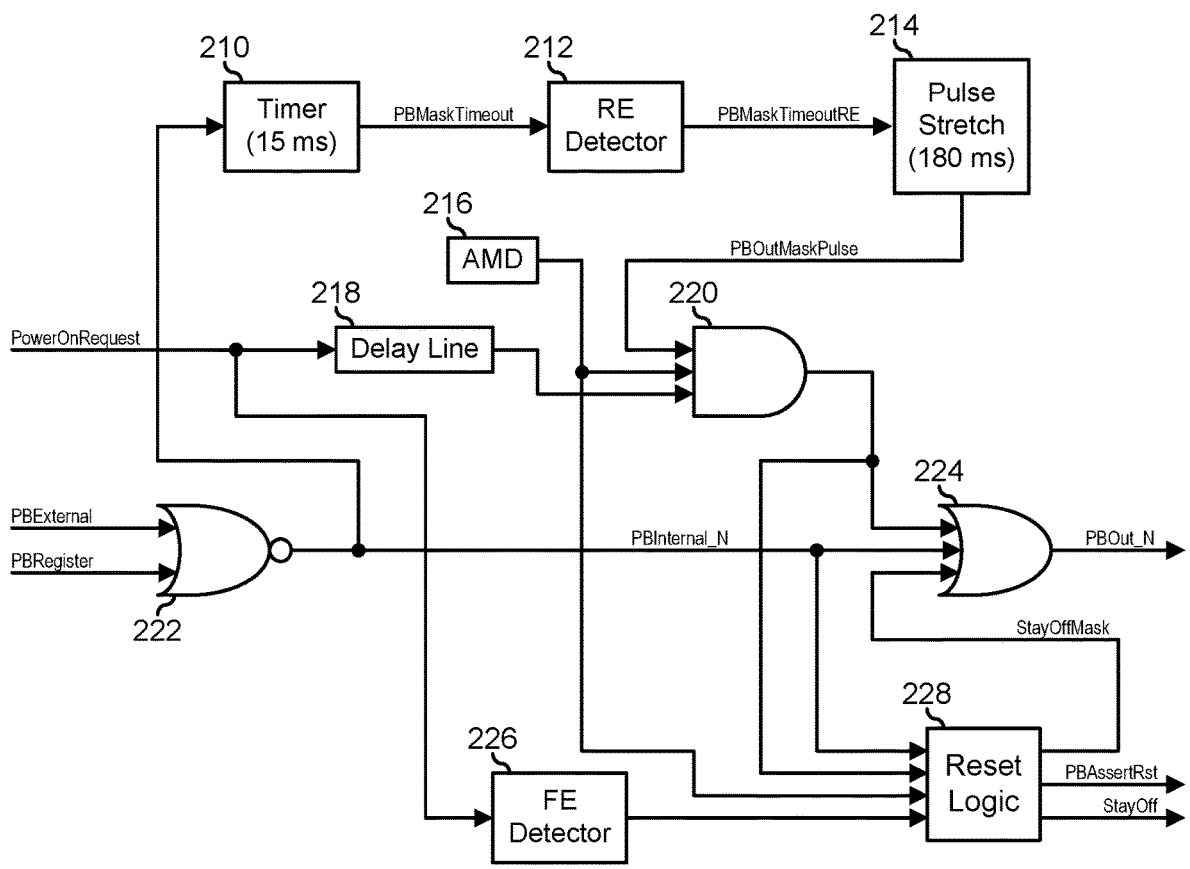
FIG. 2 is a logic diagram of power button circuit according to another embodiment of the present disclosure.

FIG. 2 illustrates a power button circuit 200 that provides common power button functionality on information handling systems that utilize either an Intel-based architecture or an AMD-based architecture. The power button functionality provided by power button circuit 200 provides Intel-like power button functionality. Power button circuit 200 includes a timer 210, a rising-edge detector 212, a pulse stretch circuit 214, an AMD architecture setting 216, a delay line 218, an AND-gate 220, a NOR-gate 222, an OR-gate 224, a falling-edge detector 226, and reset logic 228. Power button circuit 200 operates to receive a power on request input (PowerOnRequest), an external push button input (PBExternal), and a push button register input (PBRegister), to provide an active-low push button output (PBOut_N), an active-high push button assert reset output (PBAssertRst), and an active-high stay off output (StayOff). Reset logic 228 may represent a complex programmable logic device (CPLD) or another programmable logic device, as needed or desired, and may be represented by add-on resource 174 in FIG. 1.

NOR-gate 222 has two inputs to receive PBExternal and PBRegister, and has an output to provide an active-low push button internal output (PBInternal_N). Timer 210 has an input to receive PBInternal_N, and has an output to provide a push button mask timeout output (PBMaskTimeout). Rising-edge detector 212 has an input to receive PBMaskTimeout, and has an output to provide a push button mask timeout rising-edge output (PBMaskTimeoutRE). Pulse stretch circuit 214 has an input to receive PBMaskTimeoutRE, and has an output to provide a push button mask pulse output (PBMaskPulse). Delay line 218 has an input to receive PowerOnRequest, and has an output. AMD architecture setting 216 is a single bit that is set to a logic "0" when the information handling system that includes power button circuit 200 utilizes Intel-based components, and that is set to a logic "1" when the information handling system utilizes AMD-based component. Thus AMD architecture setting 216 has an output to provide the single bit information. AND-gate 220 has three inputs to receive PBOutMaskPulse, the output from AMD architecture setting 216, and the output from delay line 218, and has an output. OR-gate 224 has three inputs to receive PBInternal_N, the output from AND-gate 220, and a StayOffMask output from reset logic 228, and has an output to provide PBOut_N. Falling-edge detector 226 has an input to receive PowerOnRequest, and has an output. Reset logic 228 has four inputs to receive PBInternal_N, the ouput from AND-gate 220, the output from AMD architecture setting 216, and the output from falling-edge detector 226, and has three outputs to provide PBAssertRst, StayOff, and StayOffMask.

Power button circuit 200 operates in one of two modes: an Intel-based mode and an AMD-based mode. When AMD architecture setting 216 stores "0," power button circuit 200 operates in the Intel-based mode. Here, AMD architecture setting 216 provides "0" to the input of AND-gate 220, ensuring that the input of OR-gate 224 remains de-asserted, and further ensuring that PBInternal_N from NOR-gate 222 is passed on as the output PBOut_N. Here, under normal circumstances, both PBExternal and PBRegister are normally low ("0") and PBInternal_N is provided at the output of NOR-gate 222 at "1." Then, when either of PBExternal or PBRegister are asserted, PBInternal_N is asserted, that is, transitioned from a "1" to a "0," and the output of NOR-gate 222 is likewise asserted from a "1" to a "0." Here OR-gate 224 provides the output PBOut_N, which is detected by the associated Intel-based chipset as an assertion of the power button, and the chipset initiates the graceful shutdown. Here further, the Intel-based chipset is configured to detect the assertion of either PBExternal or PBRegister for longer than the PBO level and provides the hard shutdown as desired. Further, in the Intel-based mode, "0" is provided by AMD architecture setting 216 to reset logic 228, which is configured to provide Intel-like reset functions based upon PowerOnRequest and on the assertions of either PBExternal or PBRegister, as are known in the art.

When AMD architecture setting 216 is stored with "1," power button circuit 200 operates in the AMD-based mode. Here, AMD architecture setting 216 provides the "1" to the input of AND-gate 220. In the steady operating state, PowerOnRequest is asserted ("1"), and delay line 218 has timed out such that the output of the delay line is likewise asserted. As such, the signal provided by AND-gate 220 is based upon the status of PBOutMaskPulse, which, in the steady state, is de-asserted. Thus, in the steady state, the output of AND-gate 220 and StayOffMask are de-asserted, and, as described above, the output of OR-gate 224 is dependent upon the status of PBInternal_N. Again, both PBExternal and PBRegister are normally de-asserted and PBInternal_N remains de-asserted. Then, when either of PBExternal or PBRegister are asserted, PBInternal_N is asserted. Here OR-gate 224 asserts the output PBOut_N, which is not detected by the associated AMD-based chipset as an assertion of the power button circuit, and the chipset does not initiate a graceful shutdown. However, the assertion of PBInternal_N is also seen by timer 210 and starts the timer. Timer 210 may be set for a duration that is much shorter than the PBO time, such as 15 ms. After timer 210 times out, PBMaskTimeout is asserted and the assertion is detected by rising-edge detector 212 which causes the rising-edge detector to assert PBMaskTimeoutRE to pulse stretch circuit 214. Pulse stretch circuit 214 is configured to detect the assertion of PBMaskTimeoutRE, and in response to assert PBOutMaskPulse for a short duration, such as 180 ms. Here, the pulse assertion of PBOutMaskPulse is provided to the input of AND-gate 220 which causes a similar pulse signal on the input of OR-gate 224, which further causes a similar pulse signal on PBOut_N. Here, the rising edge of the pulse signal is detected by the chipset, and the chipset initiates the graceful shutdown of the information handling system. Finally, the AMD-based chipset is also configured to detect the assertion of either PBExternal or PBRegister for longer than the PBO level and provides the hard shutdown as desired.

Figure 3:
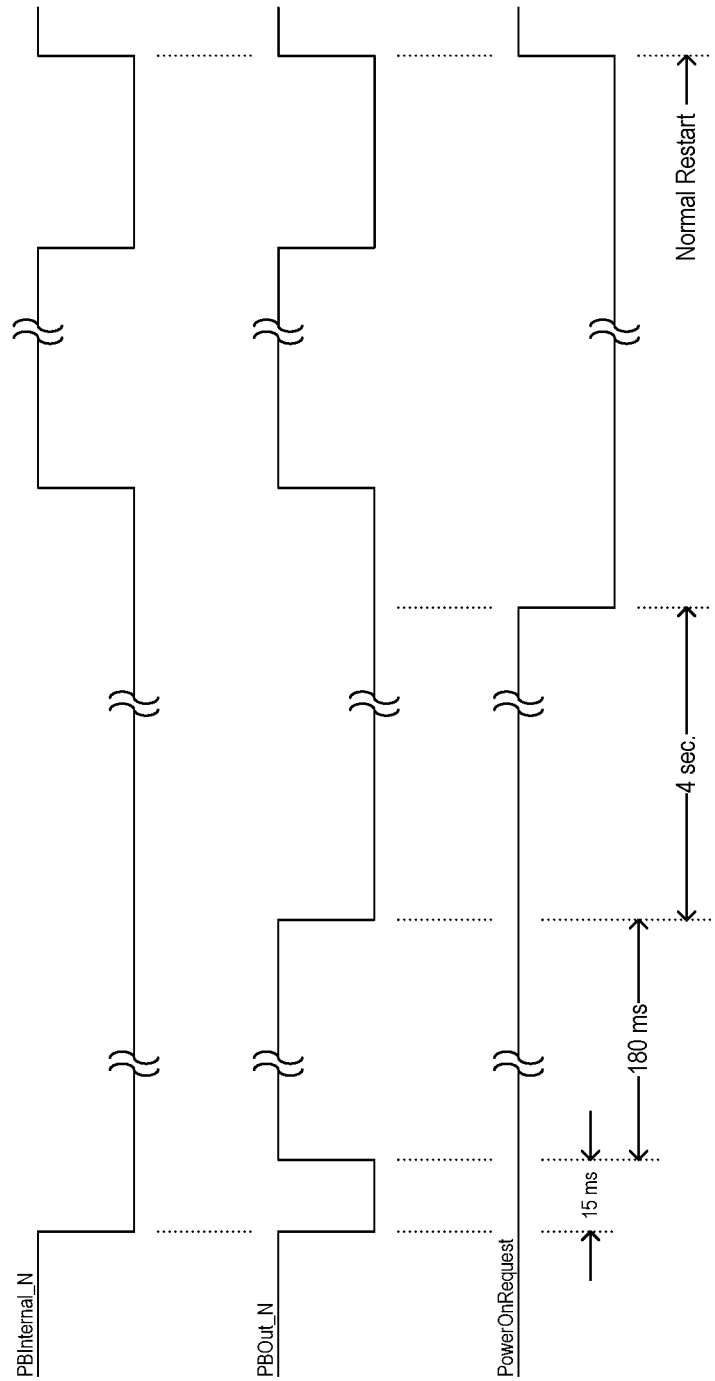
FIG. 3 is a waveform diagram for the implementation of the power button circuit of FIG. 1 when the circuit is configured in an AMD-based mode.

FIG. 3 illustrates waveforms for the implementation of power button circuit 200 when the circuit is configured in the AMD-based mode. In particular, PBInternal_N is shown as being asserted (active low) for greater than 4.195 seconds, that is, for greater that 195 ms, as described below, plus the PBO duration, assumed herein to be four (4) seconds. Here, the assertion of PBInternal_N is followed by the immediate assertion (active low) of PBOut_N. As used herein, the immediate following of one event by another will be understood to not necessarily denote a particular time limit, but will be understood to be determined as a circuit delay that is provided by the particular implementation of power button circuit 200. The assertion of PBInternal is detected by timer 210, rising-edge detector 212, and pulse stretch circuit 214, which together operate to de-assert PBOut_N five (15) ms after the assertion of PBInternal_N for a period of 180 ms, after which time PBOut_N is reasserted. In this way, a constantly held assertion of a power button results in a rising edge signal on PBOut_N that is detected by the AMD-based chipset, which operates to initiate a graceful shutdown of the information handling system. Then, because PBInternal_N is asserted for greater than the PBO duration, when PBInternal_N has been asserted for four (4) seconds, PowerOnRequest is de-asserted to cause the hard shutdown of the information handling system. Finally, after the information handling system is fully shut down, the reassertion of PBInternal_N is followed by the immediate assertion of PBOut_N which results in the reassertion of PowerOnRequest to reboot the information handling system.

Figure 4:
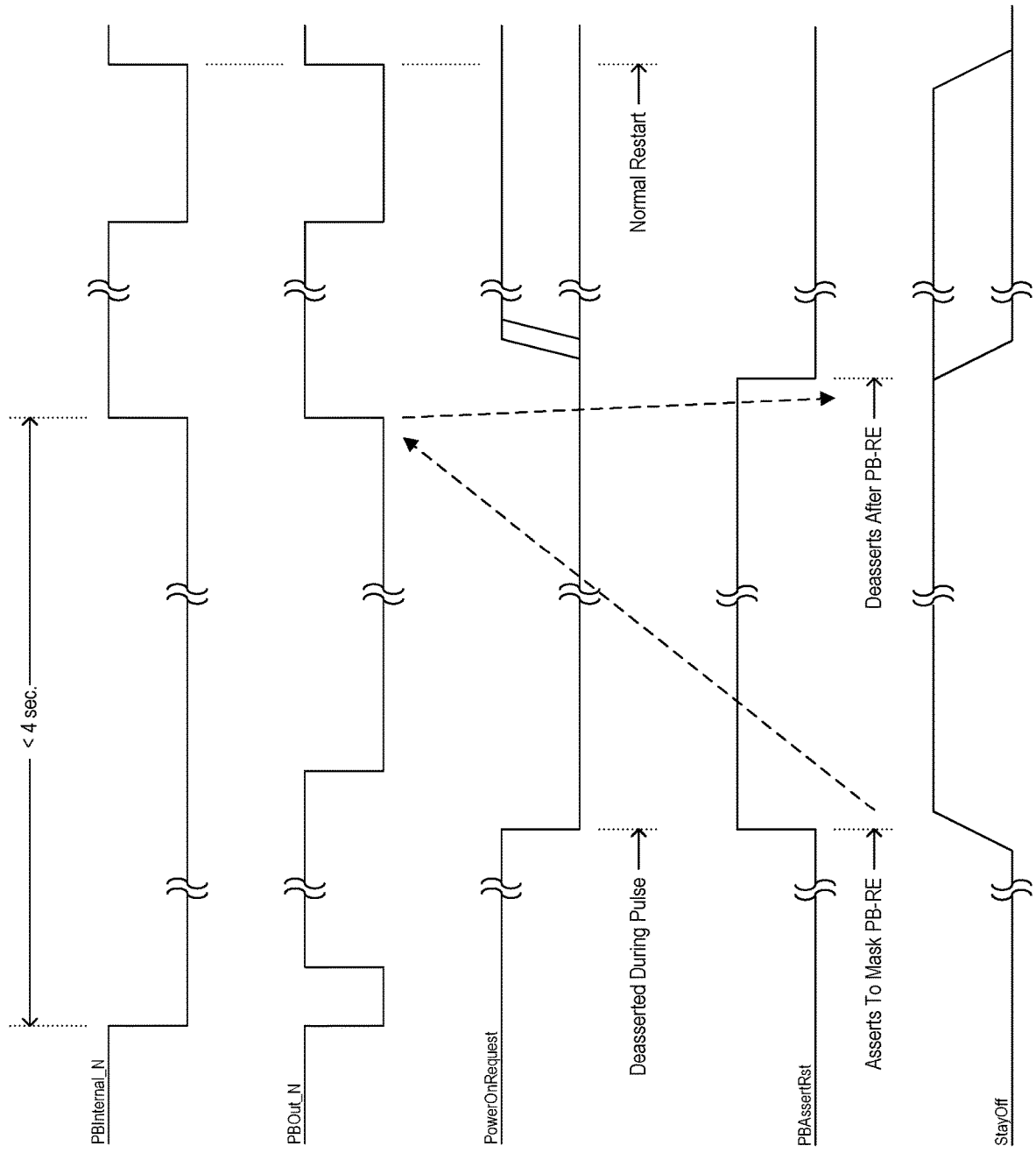
FIG. 4 is a waveform diagram for the implementation of the power button circuit of FIG. 1 when the circuit is configured in the AMD-based mode, and when the information handling system has a non-ACPI OS.

FIG. 4 illustrates waveforms for the implementation of power button circuit 200 when the circuit is configured in the AMD-based mode, and when the information handling system has a non-ACPI OS. In particular, PBInternal_N is shown as being asserted (active low) for less than the PBO duration, assumed herein to be four (4) seconds. Here, as above, the assertion of PBInternal_N is followed by the immediate assertion (active low) of PBOut_N. The assertion of PBInternal is detected by timer 210, rising-edge detector 212, and pulse stretch circuit 214, which together operate to de-assert PBOut_N five (15) ms after the assertion of PBInternal_N for a period of 180 ms, after which time PBOut_N is reasserted. In this way, a constantly held assertion of a power button results in a rising edge signal on PBOut_N that is detected by the AMD-based chipset, which operates to initiate a graceful shutdown of the information handling system. However, here it is further assumed that the graceful shutdown results in the de-assertion of PowerOnRequest prior to the completion of the pulse on PBOut_N. Here, in the non-ACPI OS, the subsequent rise in PBOut_N when PBInternal_N is de-asserted (active low) could be interpreted by the AMD-based chipset as a request to reboot the information handling system. As such, reset logic 228 is configured to detect AMD architecture setting 216 to indicate that power button circuit 200 is in the AMD-based mode. Thus, in response to the de-assertion of PowerOnRequest, reset logic 228 is configured to assert PBAssetRst until after the second rising edge of PBOut_N to prevent the chipset from performing a spurious reboot of the information handling system. Finally, after the information handling system is fully shut down, the reassertion of PBInternal_N is followed by the immediate assertion of PBOut_N which results in the reassertion of PowerOnRequest to reboot the information handling system.

Here, StayOffMask operates to block PBOut_N from being asserted and preventing the AMD-based chipset from falsely interpreting the previous rising-edge of PBinternal_N to be a request to turn back on, thereby de-asserting PowerOnRequest prior to a subsequent power button event. Further, the information handling system can be configured by user policy to behave in one of several desired ways if AC power is lost (ACPI G3 State). Typically the information handling system is configured to "Turn On" when AC power is restored. Other options include "Turn Off" or "Last State." Here, reset logic 228 asserts PBAssertRst to the chipset and the chipset follows the After_G3 execution path. Here, StayOffMask is asserted to keep the information handling system from turning back on at the rising edge of PBInternal_N. StayOff is an internal signal that prevents the information handling system power controls from turning ON the information handling system even if the chipset asserts PowerOnRequest. Reset logic 228 thus asserts or does not assert StayOffMask to block the subsequent power button event from being received by the chipset on PBOut_N.

For purpose of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system based on one of a first hardware architecture and a second hardware architecture, the information handling system comprising:
    a chipset component configured to implement one of the first or second hardware architectures; and
    a power button circuit coupled to the chipset component, the power button circuit configured to:
        receive an input signal from an assertion of a power button;
        determine that the chipset component is configured to implement the first hardware architecture;
        provide a first output signal to the chipset component in response to determining that the chipset component is configured to implement the first hardware architecture, the first output signal being based on the input signal;
        determine that the chipset component is configured to implement the second hardware architecture; and
        provide a second output signal to the chipset component in response to determining that the chipset component is configured to implement the second hardware architecture, the second output signal being based on the input signal for a first predetermined time, followed by a pulse to the chipset component for a second predetermined time, wherein when the chipset component implements the first hardware architecture, the chipset component responds to a falling edge of the first output signal to power down the information handling system.

2. The information handling system of claim 1, wherein when the chipset component implements the second hardware architecture, the chipset component responds to a rising edge of the second output signal to power down the information handling system.

3. The information handling system of claim 1, wherein the input signal from the power button comprises a transition from a logic low (0) state to a logic high (1) state.

4. The information handling system of claim 3, wherein the first output signal comprises a transition from the logic high (1) state to the logic low (0) state.

5. The information handling system of claim 3, wherein the second output signal comprises a transition from the logic high (1) state to the logic low (0) state for the first predetermined time and wherein the pulse comprises the logic high (1) state for the second predetermined time.

6. The information handling system of claim 1, wherein:
    when the chipset component implements the first hardware architecture, the power button circuit is further configured to determine that the input signal remains asserted for longer than a push button override time; and
    the chipset component is configured to shut down the information handling system in response to the determination that the input signal remains asserted for longer than the push button override time.

7. The information handling system of claim 1, wherein:
    when the chipset component implements the second hardware architecture, the power button circuit is further configured to determine that the input signal remains asserted for longer than a sum of the first predetermined time, the second predetermined time, and a push button override time; and
    the chipset component is configured to shut down the information handling system in response to the determination that the input signal remains asserted for longer than the sum of the first predetermined time, second predetermined time, and the push button override time.

8. The information handling system of claim 1, wherein when the chipset component is configured to implement the first hardware architecture, the chipset component is based upon an Intel architecture.

9. The information handling system of claim 1, wherein when the chipset component is configured to implement the second hardware architecture, the chipset component is based upon an AMD architecture.

10. A method for providing a power button input for an information handling system, wherein the information handling system is based on one of a first hardware architecture and a second hardware architecture, the method comprising:
    receiving, by a power button circuit of the information handling system coupled to a chipset component of the information handling system, an input signal from an assertion of a power button of the information handling system, wherein the chipset component is configured to implement one of the first or second hardware architectures;
    determining, by the power button circuit, that the chipset component is configured to implement the first hardware architecture;
    providing, by the power button circuit, a first output signal to the chipset component in response to determining that the chipset component is configured to implement the first hardware architecture, the first output signal being based on the input signal;
    determining, by the power button circuit, that the chipset component is configured to implement the second hardware architecture;
    providing a second output signal to the chipset component in response to determining that the chipset component is configured to implement the second hardware architecture, the second output signal being based on the input signal for a first predetermined time, followed by a pulse to the chipset component for a second predetermined time; and
    when the chipset component implements the second hardware architecture, responding, by the chipset component, to a rising edge of the second output signal to power down the information handling system.

11. The method of claim 10, wherein when the chipset component implements the first hardware architecture, the method further comprises:
    responding, by the chipset component, to a falling edge of the first output signal to power down the information handling system.

12. The method of claim 10, wherein the input signal from the power button comprises a transition from a logic low (0) state to a logic high (1) state.

13. The method of claim 12, wherein the first output signal comprises a transition from the logic high (1) state to the logic low (0) state.

14. The method of claim 12, wherein the second output signal comprises a transition from the logic high (1) state to the logic low (0) state for the first predetermined time and wherein the pulse comprises the logic high (1) state for the second predetermined time.

15. The method of claim 10, further comprising:
determining, by the power button circuit when the chipset component implements the first hardware architecture, that the input signal remains asserted for longer than a push button override time; and
shutting down, by the chipset component, the information handling system in response to the determination that the input signal remains asserted for longer than the push button override time.

16. The method of claim 10, further comprising:
determining, by the power button circuit when the chipset component implements the second hardware architecture, that the input signal remains asserted for longer than a sum of the first predetermined time, the second predetermined time, and a+ push button override time; and
shutting down, by the chipset component, the information handling system in response to the determination that the input signal remains asserted for longer than the sum of the first predetermined time, the second predetermined time, and the push button override time.

17. The method of claim 10, wherein when the chipset component is configured to implement the first hardware architecture, the chipset component is based upon an Intel architecture, and when the chipset component is configured to implement the second hardware architecture, the chipset component is based upon an AMD architecture.

18. A power button circuit for an information handling system, the power button circuit comprising:
a push button including an output terminal, the push button configured to provide a logic low signal when the push button is activated and to provide a logic high signal when the push button is not activated;
a timer circuit including an input terminal coupled to the output terminal of the push button, and an output terminal;
a rising-edge detector circuit including an input terminal coupled to the output terminal of the timer circuit, and an output terminal;
a pulse circuit including an input terminal coupled to the output terminal of the rising-edge detector circuit, and an output terminal, the pulse circuit configured to output a pulse signal of a predetermined duration in response to the output of the rising-edge detector circuit;
an AND-gate including a first input terminal coupled to the output terminal of the pulse circuit, a second input terminal, and an output terminal;
an architecture selection element configured to store a first state when the information handling system is based on a first hardware architecture, and to store a second state when the information handling system is based on a second hardware architecture, the architecture selection element including an output terminal coupled to the second input terminal of the AND-gate; and
an OR-gate including a first input terminal coupled to the output terminal of the AND-gate, a second input terminal coupled to the output terminal of the push button, and an output to provide a push button signal to a chipset component of the information handling system, the chipset component being configured to implement one of the first or second hardware architectures for the information handling system.

* * * * *